April 24, 1951 E. T. SLIWINSKI 2,549,859
FLOAT
Filed June 6, 1946 2 Sheets-Sheet 1

INVENTOR.
Eugene T. Sliwinski,
BY
Bair & Freeman
Attys.

April 24, 1951 E. T. SLIWINSKI 2,549,859
FLOAT
Filed June 6, 1946 2 Sheets-Sheet 2
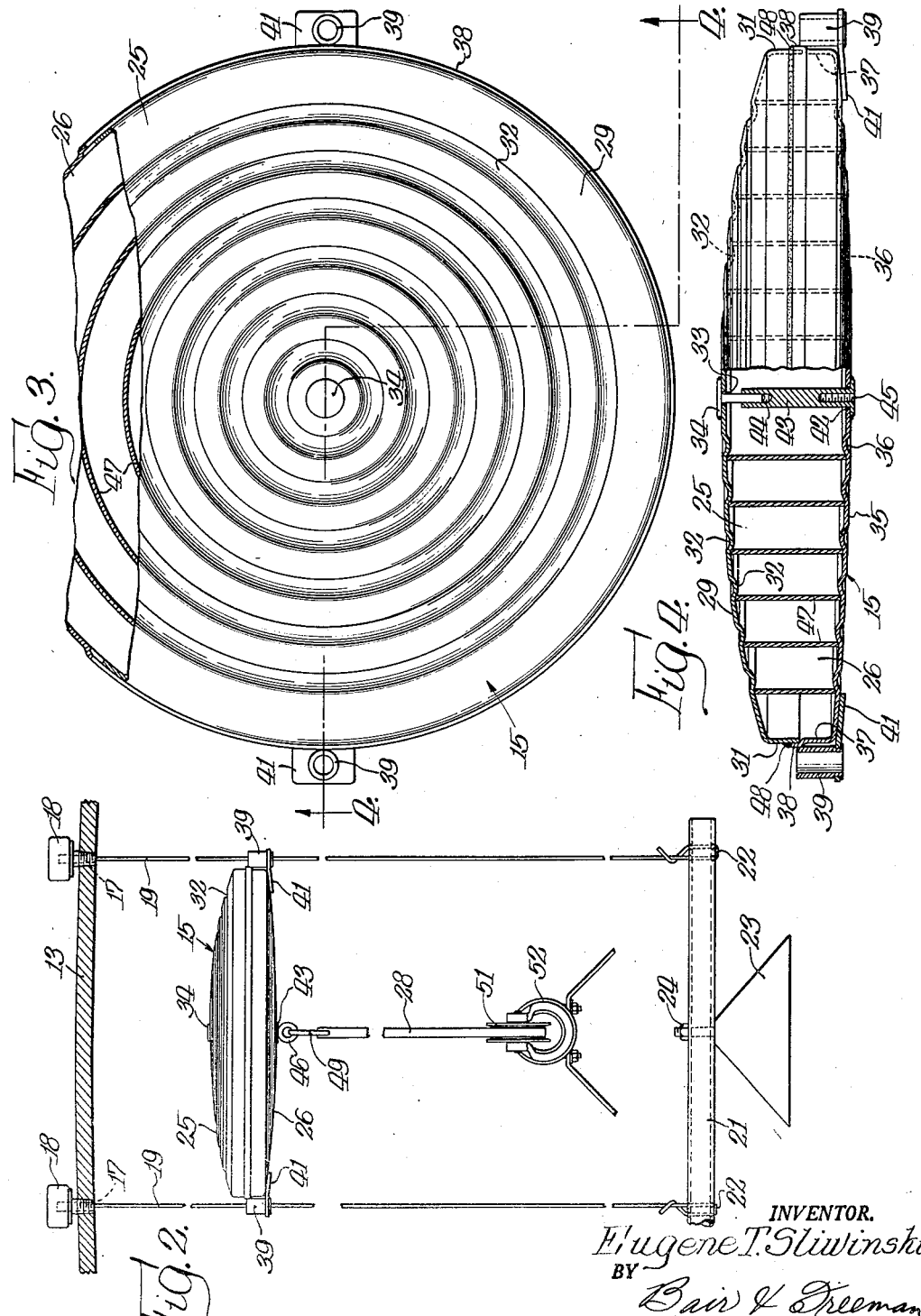
INVENTOR.
Eugene T. Sliwinski
BY
Bair & Freeman
Attys.

Patented Apr. 24, 1951

2,549,859

UNITED STATES PATENT OFFICE 2,549,859

FLOAT

Eugene Thomas Sliwinski, Chicago, Ill., assignor to Telematic Corporation, Chicago, Ill., a corporation of Delaware Application June 6, 1946, Serial No. 674,914

5 Claims. (Cl. 137—104)

This invention relates to floats and particularly to reinforced floats of the type employed to indicate the level of liquid, for example, in a closed tank.

Heretofore, various types of floats have been utilized for tank gauges, and when the pressure in the tank is substantially atmospheric, no particular problem arises. In tanks wherein the pressure rises above atmospheric, however, such as spheroid tanks containing a distilled or refined hydrocarbon product, the pressure tends to either crush the float or cause leaks which vary the buoyancy of the float and, therefore, the accuracy of its associated gauging apparatus. Pressure in such tanks, at times, reaches 75 pounds per square inch, and above. It is, furthermore, important that the float be relatively light and fairly large in order to be readily responsive to changes in liquid level. Such floats are usually mounted on guide wires hung from the top of the tank, as is usual in sphere and spheroid tanks. Also, the float should have a considerable amount of buoyancy, whereby very small adjustments of the gauging apparatus are required for different types of liquid. The relatively large size, which is necessary, together with the lightness required, further complicates the problem of providing a float which does not collapse or leak at varying pressures above atmospheric.

It is an object of the invention, therefore, to provide an exceptionally strong and light float primarily for use under pressure conditions above atmospheric.

It is also an object of the invention to provide a float of reinforced magnesium.

It is another object of the invention to provide an internally reinforced float formed of non-corroding metal, for association with a tank gauge, particularly with tanks wherein chemicals or refined oils are stored and in which the pressure is normally above atmospheric.

It is also an object of the invention to provide an improved internally reinforced, welded float.

It is still another object of the invention to provide an internal reinforcement for a float comprising, essentially, a plurality of concentric reinforcing members; and, furthermore, to provide a unique structure for not only retaining the reinforcing members in position, but also in itself serving to reinforce the float structure.

It is a further object of the invention to provide an improved construction for attaching the gauge tape or wire to the float of a liquid level gauging apparatus.

It is still a further object of the invention to provide a novel flexible center post construction for a float.

It is also an object of the invention to provide an improved two-piece housing for a float which is provided with internal reinforcement, thereby facilitating assembly of the float.

With these and other objects in view, my invention consists in the construction, arrangement and combination of the various parts of my device whereby the objects contemplated are attained as hereinafter more fully set forth, pointed out in my claims, and illustrated in the accompanying drawings, in which:

Figure 2 is an enlarged detail view of the improved float, guides and tape connection, taken on line 2—2 of Fig. 1;

Figure 3 is an enlarged partial plan view of the float with parts thereof broken away for the sake of clarity; and Figure 4 is a view, partially in section, taken on line 4—4 of Figure 3.

Figure 1:
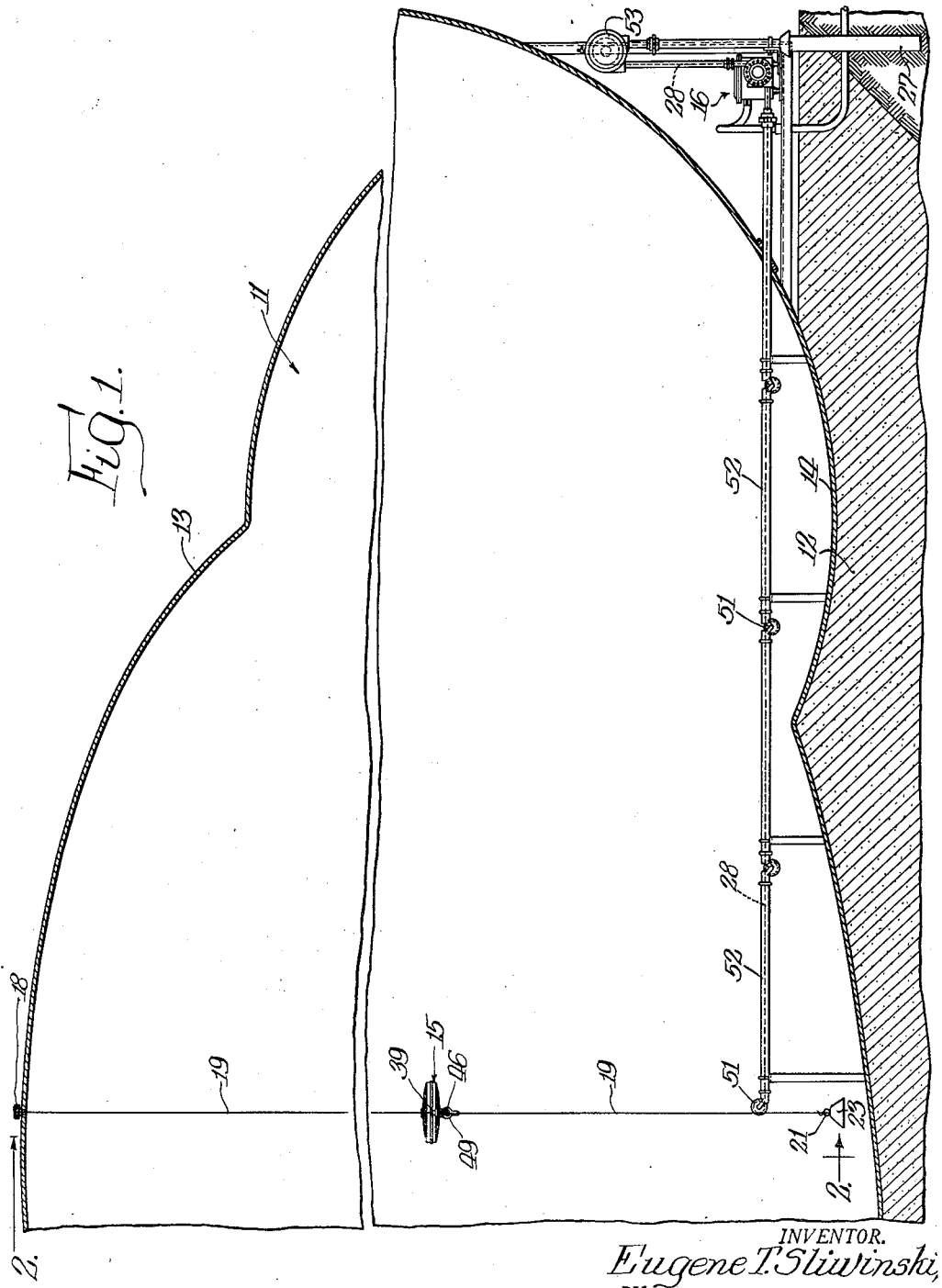
Figure 1 is a partial sectional view through a spheroid tank embodying the improved float which is associated with automatic gauging apparatus.

Referring specifically to the drawings for a detailed description of the invention, Figure 1 shows a conventional spheroid tank 11, generally used for storing highly volatile liquids such as refined oil. The tank usually rests on a supporting base indicated by the numeral 12. The top of the tank is indicated at 13 and the bottom thereof at 14. Because of the shape of spheroid tanks, it is usual to dispose a float 15 adjacent the center thereof for connection to a gauging device generally indicated at 16, which is disposed externally of the tank adjacent the bottom thereof. Where volatile liquids are stored, it is best to locate the gauging apparatus at the bottom of the tank so that the gauging apparatus is easier to install and service. However, as will be apparent as the description proceeds, the novel float is applicable to tanks wherein the gauging apparatus is disposed at the top of the tank instead of the bottom thereof.

In the form shown in Figure 1, two threaded studs 17 are screwed into the top 13 of the tank 11 adjacent the center thereof, and the studs 17 are provided with protective caps 18, as best shown in Figure 2. The studs 17 support a pair of spaced relatively rigid vertical guide wires or rods 19 which are connected to a cross-arm 21 adjacent their lower extremities, by looping the guide wires 19, shown at 22, around the cross-arm 21. A weight 23 is secured to the cross-arm 21 by a nut and bolt connection, indicated at 24. The weight 23 maintains the wires 19 straight and under tension so that there is no tendency for the wires 19 to kink when the liquid level in tank 11 changes.

The float 15 is preferably formed of an upper cup-shaped housing member 25 and a lower co-operating cup-shaped housing member 26. Preferably also, the housing members 25 and 26 are formed of sheet magnesium because of its lightness, strength and non-corrosive properties. With a lighter construction, more accurate gauging is obtained. The use of magnesium is particularly important in a reinforced float construction.

However, the float may also be formed from sheet aluminum, copper or stainless steel, if so desired.

The upper cup-shaped housing member 25 has an upper wall 29 formed in the shape of an arch for strength. A depending flange 31 extends from the upper wall 29. The upper wall is provided with a series of concentric downwardly directed corrugations 32. An aperture 33 is provided centrally of the upper wall 29 and a stud 34, also preferably of magnesium, is welded in the opening 33, thus providing a fluid tight closure for the opening 33.

The bottom cup-shaped housing member 26 comprises a flat bottom wall 35 provided with upwardly directed concentric corrugations 36 corresponding in number to the corrugations 32 in the upper wall 29 and being substantially vertically aligned therewith. An upwardly turned annular flange 37 extends from the bottom wall 35 and is slightly enlarged at 38 to telescopically engage the downwardly depending flange 31 of upper housing 25. A pair of diametrically opposed tubular guide members 39 for encompassing the wires 19 are preferably welded by ears 41 to the flat bottom wall 35. The flat bottom wall 35 is also provided with a central aperture 42 and has a stud 43 welded thereto to provide a fluid tight closure for the aperture 42.

The upper end of the stud 43 is provided with a smooth bore 44 therein, into which the lower end of the stud 34 loosely extends. The lower end of stud 34 normally does not extend to the bottom of bore 44, as best shown in Figure 4. The lower end of stud 43 is tapped at 45, as shown in Figure 4, and an eyebolt 46 is screwed into the tapped opening 45, as shown in Figure 2.

A series of annular vertically extending reinforcing rings 47 are disposed interiorly of the housings 25 and 26, in the following manner. After the lower housing 26 is formed and stud 43 and ears 41 welded thereto, the rings 47 are placed in position with the shorter rings nearest the periphery of the float to conform to the arched upper wall 29. The rings 47 are likewise preferably formed of magnesium, or if the housings are formed of another material, the rings 47 are preferably formed of the same material to prevent electrolytic action between different metals. After the stud 34 is welded to the upper housing member 25, the housing member is telescoped into flange 38 of the lower housing member 26 and the lower end of stud 34 is loosely inserted in the bore 44 of stud 43. The two housings are then welded together at 48 peripherally thereof to form a fluid tight float structure.

An important feature of the invention resides in the disposition of the rings 47 in abutment with the outer slopes of the internally extending corrugations 32 and 36, whereby the rings 47 are securely anchored in place between the upper and lower housings 25 and 26, thus reinforcing them, while the corrugations themselves serve to reinforce the float structure. Furthermore, when the float expands and contracts due to pressure changes, the studs 34 and 43 will not pull out of their welds, because the loose fit and the spare space in the bore 44 affords relative movement between the studs 34 and 43. The studs, however, serve to reinforce the structure, as a whole.

As best shown in Figures 1 and 2, the tape 28 is secured to eyebolt 46 by a hook 49 and the tape 28 passes over rollers 51 and through pipes 52 to the gauging apparatus 16, over a pulley 53 and then is secured to the counter-weight 27. The counterweight 27 and float 15, obviously, maintain the tape 28 taut at all times.

The particular gauging apparatus 16 forms no part of the present invention, and further reference thereto is deemed unnecessary, except to state that it translates the level of the liquid in the tank 11 to indicia reading in feet, inches, and fractions of an inch of liquid. The particular forms of rollers and pipe connections inside the tank which carry the tape 28 are fully described and claimed in my copending application, Serial No. 674,915, filed June 6, 1946, for Flexible Connector Guide.

It will also be apparent that if the float is to be used with top mounted gauging apparatus, i. e., where the gauging apparatus is disposed at the top of the tank and the tape 28 extends upwardly from float 15, all that is necessary is to place stud 34 in the lower wall and stud 43 in the upper wall of the float.

From the foregoing, it will be apparent that a novel light weight, reinforced float construction has been provided, which is particularly useful with liquid level indicating apparatus for use in tanks for storing highly volatile liquids, such as refined oils.

Some changes may be made in the construction and arrangement of the parts of my float without departing from the real spirit and purpose of my invention; and it is my intention to cover by my claims any modified forms of structure or use of mechanical equivalents which may be reasonably included within their scope without sacrificing any of the advantages thereof.

I claim as my invention:

1. A reinforced float construction comprising a pair of substantially cup-shaped members, said members each including a main wall and annular flanges extending therefrom, means for securing said annular flanges together to form a closed float chamber, annular corrugations on said main walls extending toward each other, and annular reinforcing members disposed between said main walls and engaging the sides of the corrugations.

2. A reinforced float construction comprising a pair of substantially cup-shaped members each including a main wall and annular flanges extending therefrom, one of said main walls being convex in shape, means for securing said annular flanges together to form a fluid tight float chamber, a plurality of annular corrugations on said main walls, and a plurality of annular reinforcing members disposed between said main walls within said float chambers and engaging the corrugations.

3. A reinforced float construction comprising a pair of substantially cup-shaped members each including a main wall and annular flanges extending therefrom, one of said main walls being convex in shape, means for securing said annular flanges together to form a fluid tight float chamber, a plurality of concentric annular corrugations on said main walls, a plurality of annular reinforcing members disposed between said main walls within said float chambers and engaging the outer edges of the corrugations, and wire guides welded to one of said cup-shaped members and extending outwardly therefrom.

4. A reinforced float construction comprising a pair of substantially cup-shaped members, said members each including a main wall and annular flanges extending therefrom, means for securing said annular flanges together to form a fluid tight float chamber, a stud welded centrally of one of said main walls and extending inwardly of the float chamber, said stud protruding from the outside of said main wall, and a second stud welded to the other of said main wall members and having a portion extending inwardly of said float chamber and telescopically engaged with said first stud.

5. A reinforced float construction comprising a sealed float chamber including two substantially horizontally extending main walls, a plurality of annular corrugations on said main walls extending inwardly of the float chamber, and a plurality of annular reinforcing members extending between said main walls and engaging the sides of said corrugations, said reinforcing members including a plurality of concentric wall members disposed within the float chamber and held in position by said corrugations.

EUGENE THOMAS SLIWINSKI.

REFERENCES CITED

The following references are of record in the file of this patent:

UNITED STATES PATENTS

| Number | Name | Date |
| --- | --- | --- |
| 461,383 | Guild | Oct. 13, 1891 |
| 849,707 | Williams | Apr. 9, 1907 |
| 855,659 | O'Brien | June 4, 1907 |
| 952,496 | Ayling | Mar. 22, 1910 |
| 1,266,637 | Snyder | May 21, 1918 |
| 1,457,055 | Brewington | May 29, 1923 |
| 1,893,026 | Harte | Jan. 3, 1933 |
| 2,009,648 | Carlson | July 30, 1935 |